US007451354B2

(12) United States Patent
Kalos et al.

(10) Patent No.: US 7,451,354 B2
(45) Date of Patent: Nov. 11, 2008

(54) APPARATUS AND METHOD TO CONFIGURE, FORMAT, AND TEST, A DATA STORAGE SUBSYSTEM PRODUCT

(75) Inventors: Matthew J. Kalos, Tucson, AZ (US); Robert A. Kubo, Tucson, AZ (US); Michael P. Vageline, Tucson, AZ (US)

(73) Assignee: International Business Business Machines, Armonk, NY (US)

( * ) Notice: Subject to any disclaimer, the term of this patent is extended or adjusted under 35 U.S.C. 154(b) by 484 days.

(21) Appl. No.: 11/326,650

(22) Filed: Jan. 6, 2006

(65) Prior Publication Data

US 2007/0162684 A1 Jul. 12, 2007

(51) Int. Cl.
*G06F 11/00* (2006.01)

(52) U.S. Cl. .................................. 714/42; 714/718

(58) Field of Classification Search .................... 714/42, 714/5, 7, 8, 54, 718; 711/1
See application file for complete search history.

(56) References Cited

U.S. PATENT DOCUMENTS 6,378,056 B2 * 4/2002 Nizar et al. ................. 711/170
6,862,704 B1 * 3/2005 Miner ........................ 714/718
7,174,425 B2 * 2/2007 Kaneda et al. .............. 711/117
7,191,285 B2 * 3/2007 Scales et al. ................ 711/114
2003/0167375 A1 * 9/2003 Morishita et al. ........... 711/112
2006/0117161 A1 * 6/2006 Venturi ...................... 711/171

* cited by examiner

Primary Examiner—Dieu-Minh Le
(74) Attorney, Agent, or Firm—Dale F. Regelman; Quarles & Brady LLP

(57) ABSTRACT

An apparatus and method are disclosed to configure, format, and test, a data storage subsystem product. The method supplies a data storage subsystem product comprising one or more host computer ports, a processor, one or more data storage device ports, and one or more data storage devices interconnected to the one or more data storage device ports. The method further supplies a configuration appliance comprising a storage configuration. The method connects the configuration appliance to one of the one or more storage device ports, boots up the data storage subsystem product, discovers the configuration appliance by the data storage subsystem product, imports storage configuration data into the data storage subsystem product, formats the one or more data storage device, and tests the input and output data transfer rates for the data storage subsystem product, wherein the formatting and testing are initiated concurrently.

6 Claims, 5 Drawing Sheets

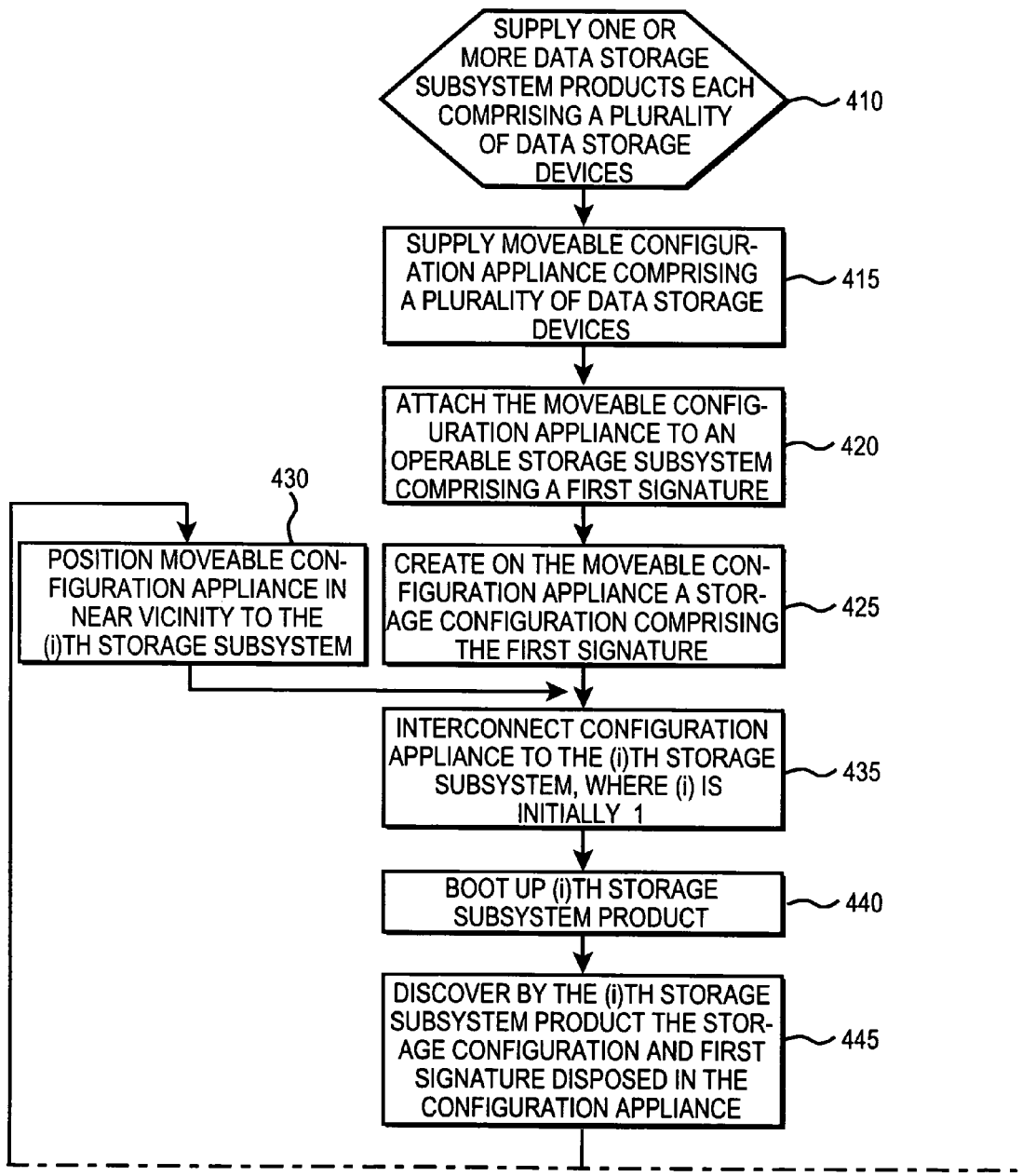

APPARATUS AND METHOD TO CONFIGURE, FORMAT, AND TEST, A DATA STORAGE SUBSYSTEM PRODUCT

FIELD OF THE INVENTION

This invention relates to an apparatus and method to configure, format, and test, a data storage subsystem product.

BACKGROUND OF THE INVENTION

Data storage subsystems are used to store information provided by one or more host computer systems. Such data storage subsystems receive requests to write information to one or more data storage devices, and requests to retrieve information from those one or more data storage devices.

Prior art methods to manufacture such a data storage subsystem product first initialize and format the one or more data storage devices disposed in the data storage subsystem product, and then write storage subsystem configuration protocols to the formatted data storage devices. The data storage subsystem product is then configured using those configuration protocols. The one or more data storage devices are again formatted to remove the configuration protocols therefrom. Thus, prior art manufacturing methods require that the one or more data storage devices disposed in a newly-manufactured data storage subsystem product be formatted two times.

What is needed is an apparatus and method to configure, format, and test, a data storage subsystem product, where the one or more data storage devices disposed in the data storage subsystem product are only formatted one time.

SUMMARY OF THE INVENTION

The invention comprises an apparatus and method to configure a data storage subsystem product. The method supplies a data storage subsystem product comprising one or more host computer ports, a processor, one or more data storage device ports, and one or more data storage devices interconnected to the one or more data storage device ports. The method further supplies an operable data storage subsystem comprising a storage configuration, and a configuration appliance comprising a plurality of data storage devices.

The method interconnects the configuration appliance with the operable data storage subsystem, and creates on the configuration appliance the storage configuration. The method then connects the configuration appliance to one of the one or more storage device ports, boots up the data storage subsystem product, discovers the configuration appliance by the data storage subsystem product, imports storage configuration data into the data storage subsystem product, configures the data storage subsystem product, formats the one or more data storage device, and tests the configured system, wherein the formatting step and the testing step are initiated concurrently.

BRIEF DESCRIPTION OF THE DRAWINGS

The invention will be better understood from a reading of the following detailed description taken in conjunction with the drawings in which like reference designators are used to designate like elements, and in which:

FIG. 4A is a flow chart summarizing the initial steps of Applicants' method to configure, format, and test a data storage subsystem product.

DETAILED DESCRIPTION OF THE PREFERRED EMBODIMENTS

This invention is described in preferred embodiments in the following description with reference to the Figures, in which like numbers represent the same or similar elements.

Figure 1:
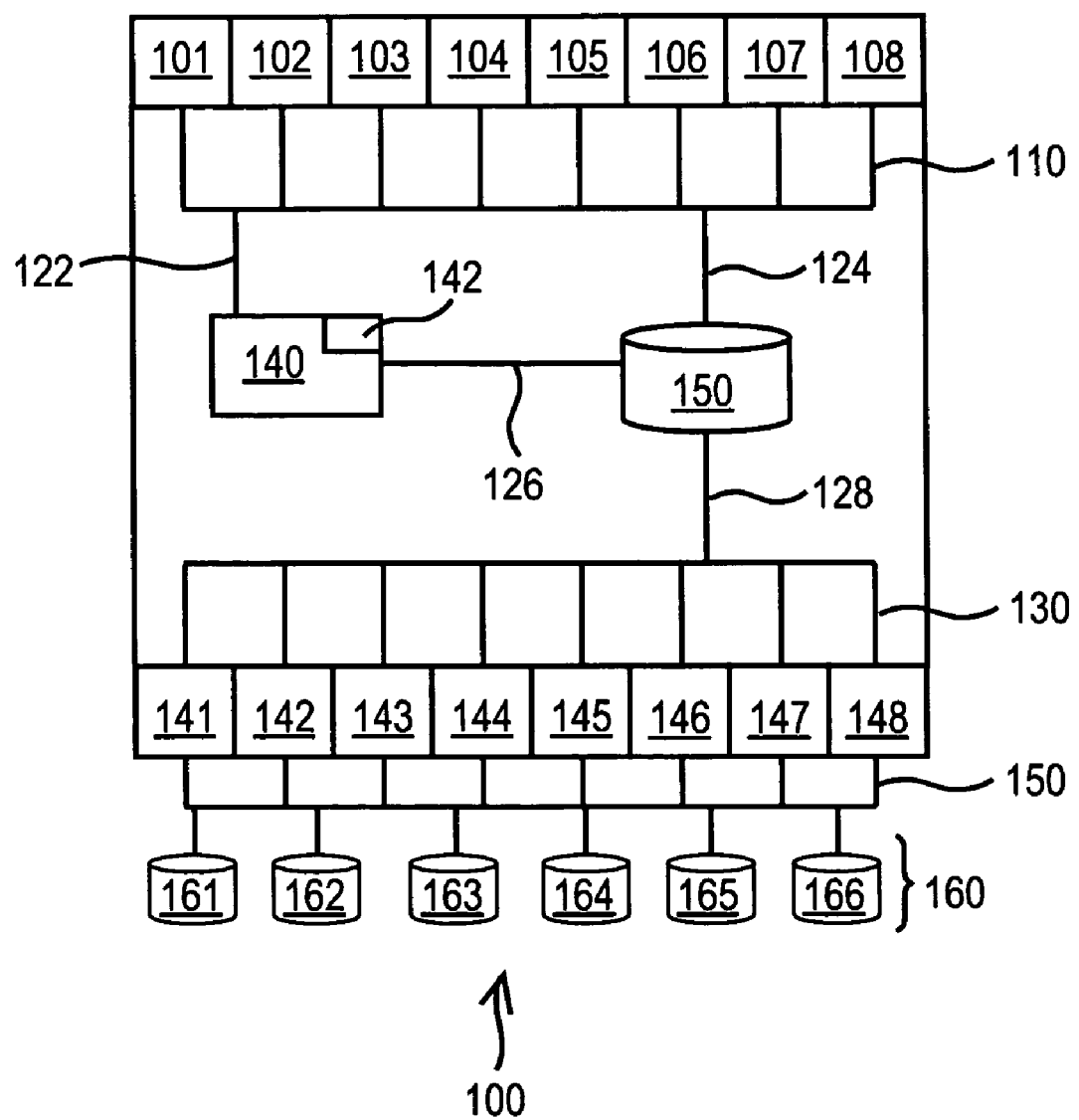
FIG. 1 is a block diagram showing one embodiment of Applicants' data storage subsystem product.

Referring now to FIG. 1, data storage subsystem 100 comprises one or more host adapters and host adapter ports. In the illustrated embodiment of FIG. 1, system 100 comprises host adapter ports 101, 102, 103, 104, 105, 106, 107, and 108. As those skilled in the art will appreciate, in other embodiments a data storage subsystem includes fewer than 8 host ports. In still other embodiments, a data storage subsystem comprises more than 8 host ports.

In certain embodiments, one or more of the host adapters are multi-ported. As a general matter, regardless of the number of host ports disposed in the data storage subsystem, each of those host ports comprises a shared resource that has equal access to both processor 140 and data cache 150 via one or more communication links 110, and communication links 122 and 124, respectively.

By "communication link," Applicants mean any combination of interconnection hardware, firmware, and/or software, including networks and buses, known to those of skill in the art, including without limitation, a wireless communication link, a Peripheral Component Interconnect bus, a serial interconnection, such as RS-232 or RS-422, an ethernet interconnection, a SCSI interconnection, an iSCSI interconnection, a Gigabit Ethernet interconnection, a Bluetooth interconnection, a Fibre Channel interconnection, an ESCON interconnection, a FICON interconnection, a Fibre Channel arbitrated loop, and combinations thereof In certain embodiments, the one or more host ports each comprise a host adapter. Each such host adapter may comprise one or more Fibre Channel ports, one or more FICON ports, one or more ESCON ports, or one or more SCSI ports, and the like.

Processor 140 communicates with cache 150 via communication link 126. In certain embodiments, processor 140 further includes memory 142. In certain embodiments, memory 142 comprises random access memory. In certain embodiments, memory device 142 comprises non-volatile memory.

Data cache 150 communicates with one or more device ports via communication link 128 and communication bus 130. In the illustrated embodiment of FIG. 1, storage subsystem 100 comprises device ports 141, 142, 143, 144, 145, 146, 147, and 148. As those skilled in the art will appreciate, a storage subsystem may include fewer than 8 data storage device ports, or more than 8 data storage device ports. In certain embodiments, the one or more device ports each comprise a device adapter.

In certain embodiments, one or more host adapters, one or more processors, and one or more device adapters are disposed on a control card disposed in storage subsystem 100. The one or more device ports communicate with one or more data storage devices via communication bus 150. In the illustrated embodiments of FIG. 1, storage subsystem 100 comprises six data storage devices. As those skilled in the art will appreciate, a storage subsystem may include fewer than 6 data storage devices, or more than 6 data storage devices.

In certain embodiments, one or more of the data storage devices comprise a plurality of hard disk drive units. In certain embodiments, the plurality of hard disk drive units utilize a RAID protocol. In other embodiments, the plurality of hard disk drive units comprise what is sometimes called a JBOD array, i.e. "Just a Bunch Of Disks" where the array is not configured according to RAID. In still other embodiments, the plurality of hard disk drive units comprise what is sometimes called an SBOD array, i.e. "Switched Bunch Of Disks".

Figure 2:
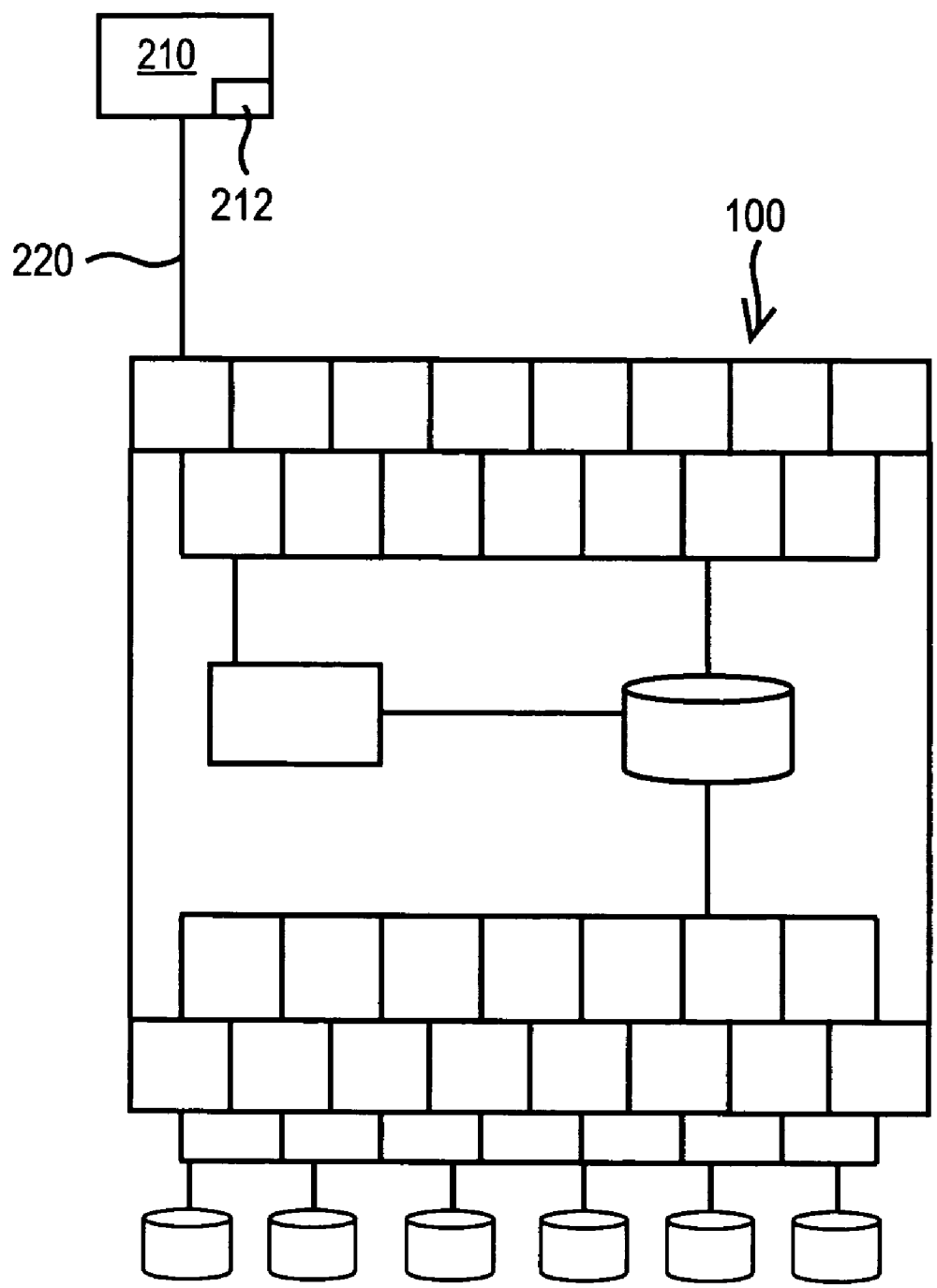
FIG. 2 is a block diagram showing the data storage subsystem product of FIG. 1 interconnected to a host computer.

FIG. 2 shows data storage subsystem 100 interconnected with host computer 210 via communication link 220. As a general matter, host computer 210 comprises a computer system, such as a mainframe, personal computer, workstation, and combinations thereof, including an operating system such as Windows, AIX, UNIX, MVS, LINUX, etc. (Windows is a registered trademark of Microsoft Corporation; AIX is a registered trademark of, and MVS is a trademark of, the IBM Corporation; UNIX is a registered trademark in the United States and other countries licensed exclusively through The Open Group; and LINUX is a registered trademark of Linus Torvald). In certain embodiments, host computer 210 further includes a storage management program 212. The storage management program 212 comprises the functionality of storage management type programs known in the art that manage the transfer of data to and from a data storage subsystem, such as the IBM DFSMS implemented in the IBM MVS operating system.

In certain embodiments, communication link 220 is selected from the group consisting of a wireless communication link, a serial interconnection, such as RS-232 or RS-422, an ethernet interconnection, a SCSI interconnection, an iSCSI interconnection, a Gigabit Ethernet interconnection, a Bluetooth interconnection, an ESCON interconnection, a FICON interconnection, a Fibre Channel interconnection, and combinations thereof.

Using prior art manufacturing methods, after assembly of a storage subsystem product, such as storage subsystem 100, a hardware verification of the assembly is performed by exercising all of the external and internal hardware paths through the system. One of the methods used to enable the hardware testing is to create a system storage configuration that an attached host computer can target with a storage application to read and write data to and from the system as an end user would. In this process, the one or more storage devices 160 are first formatted and initialized to a known data pattern, that in some embodiments may include device metadata, which is collectively referred to as the formatting process or formatting. Such a formatting process is dependent upon the number of storage devices 160 that are being processed, the capacity of the storage devices, and the performance characteristics of the storage devices, nominally this process can take about 4 hours or longer. Thereafter, storage subsystem configuration protocols, formatting protocols, initialization protocols, and test protocols, are used to configure one or more storage devices 160 into a storage configuration accessible by an attached host computer for testing of the storage system 100.

As part of creating the storage configuration on system 100, the storage system creates a signature for the configuration that associates it to system 100. The storage system signature applied during the storage configuration process enables other storage systems of the same type as system 100 to detect that the storage configuration was created by a particular machine and if the signature does not match the current machine the current machine will not access the storage configuration to prevent corrupting the existing storage configuration.

The storage subsystem is then configured, initialized, formatted, and tested, using an attached host server device or an internal device driver that targets the storage configuration, so the various protocols are used to send and receive 10 from the storage system which in turn writes data to, and/or retrieves data from, the one or more storage devices 160. Thereafter, the one or more storage devices 160 are again formatted to remove those configuration protocols, formatting protocols, initialization protocols, and storage system metadata. The second format time remains dependent on the same storage device characteristics described for the first formatting operation and can nominally take 4 hours or longer.

Applicants' invention comprises an apparatus and method to configure, format, and test a data storage subsystem product without writing to the one or more data storage devices disposed within that data storage subsystem product any configuration protocols, formatting protocols, initialization protocols, and/or test protocols. By data storage subsystem product, Applicants mean a data storage subsystem, such as for example system 100, where that system has not yet been configured, formatted, or tested, and where that system has not been interconnected with any host computers.

Figure 3:
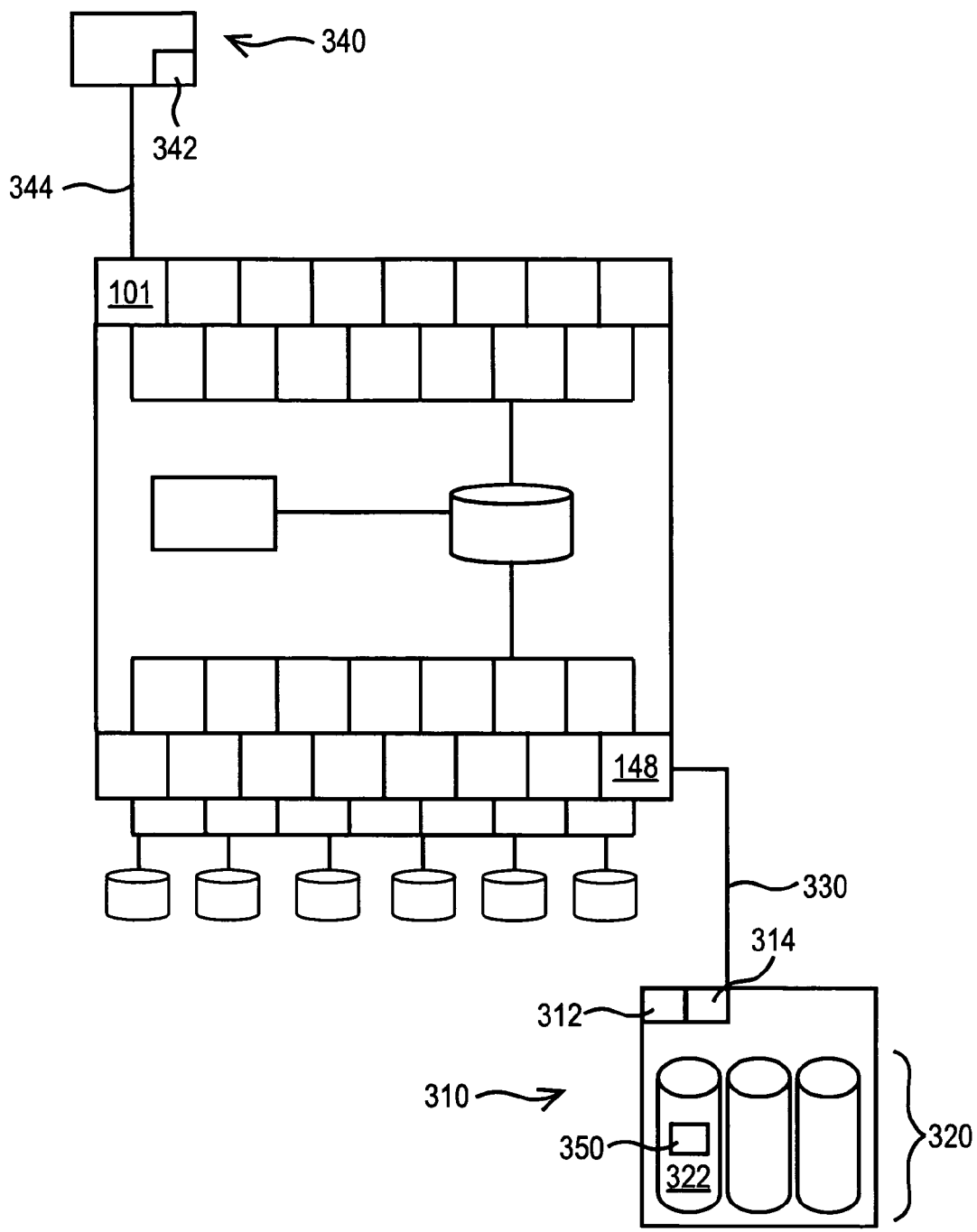
FIG. 3 is a block diagram showing Applicants' configuration appliance and test appliance interconnected to the data storage subsystem product of FIG. 1.

Referring now to FIG. 3, Applicants' apparatus comprises configuration appliance 310 and test appliance 340, where those appliances can be positioned adjacent to a data storage subsystem product. In the illustrated embodiment of FIG. 3, configuration appliance 310 is interconnected with device port 148 using communication link 330. Test appliance 340 is interconnected with host computer port 101 using communication link 344.

In certain embodiments, configuration appliance 310 comprises a moveable assembly that be positioned as needed by one person. In certain embodiments, test appliance 340 comprises a moveable assembly that be positioned as needed by one person.

In the illustrated embodiment of FIG. 3, configuration appliance 310 comprises a processor 312, instructions/functions 314, and a plurality of data storage devices 320. In certain embodiments, instructions/functions 314 comprise device microcode used by processor 312 to operate configuration appliance 310. In other embodiments, instructions/functions 314 comprise an operating system used by processor 312 to operate configuration appliance 310.

Applicants' configuration appliance 310 is first attached to an operable data storage subsystem, of the same type as storage system 100, wherein that operable data storage subsystem comprises a storage configuration. Storage configuration data, such as storage configuration data 350, comprising the operable system storage configuration is created and saved to the plurality of storage devices 320 of the configuration appliance. For purposes of clarity, in the illustrated embodiment of FIG. 3 storage configuration data 350 is shown written to data storage device 322 only. In other embodiments, storage configuration data 350 comprises a plurality of different elements, wherein one or more of those elements are written to each of the plurality of data storage devices 320.

The storage configuration data 350 includes, without limitation, RAID arrays, creation of host addressable storage units (SCSI logical units or Count Key Data volumes), and storage system metadata to identify the logical configuration information, and includes a unique storage system signature of the operable storage system. The storage configuration data need only be imported one time into Applicants' configuration appliance, and that configuration application is then used as often as needed to import a storage configuration into newly-manufactured data storage subsystem products.

In the illustrated embodiment of FIG. 3, test appliance 340 comprises instructions/functions 342, where instructions/functions 342 are used to test, inter alia, the input and output capabilities of storage subsystem product 100.

Applicants' invention further comprises a method using configuration appliance 310 and test appliance 340 to configure and test a data storage subsystem product. Referring now to FIG. 4A, in step 410 Applicants' method provides one or more data storage subsystem products, wherein each of those data storage subsystem products comprises one or more host computer ports, a processor, one or more communication links interconnecting the one or more host computer ports and the processor, one or more data storage device ports, one or more data storage devices, and one or more communication links interconnecting the one or more data storage device ports and the one or more data storage devices.

In certain embodiments, the data storage subsystem product further comprises a data cache, one or more communication links interconnecting the data cache and the one or more host computer ports, and one or more communication links interconnecting the data cache and the one or more data storage device ports.

In step 415, Applicants' method provides a moveable configuration appliance, such as for example configuration appliance 310, where that configuration appliance comprises a plurality of data storage devices. In step 420, Applicants' method provides an operable data storage subsystem, and attaches the portable configuration appliance of step 415 to that operable data storage subsystem, such as system 100 (FIG. 1), wherein that operable system comprises a storage configuration and a unique signature specific to that storage subsystem, and wherein that operable system is of the same type as the one or more data storage subsystem products of step 410. By "operable data storage subsystem," Applicants mean a fully configured and formatted system.

In step 425, Applicants' method creates on the moveable configuration appliance of step 415, storage configuration data, such as storage configuration data 350 (FIG. 3), wherein that storage configuration comprises the signature of the operable data storage subsystem of step 420. In certain embodiments, Applicants' method transitions from step 425 to step 435. In other embodiments, Applicants' method transitions from step 425 to step 430 wherein the method positions the moveable configuration appliance of step 415, such as for example appliance 310 (FIG. 3), adjacent a newly-manufactured data storage subsystem product. In certain embodiments, step 430 further comprises positioning a test appliance, such as for example test appliance 340 (FIG. 3), adjacent that newly-manufactured data storage subsystem product.

In the event (N) newly-manufactured data storage subsystem products need to be configured, formatted, and tested, then step 435 further comprises selecting the (i)th newly-manufactured data storage subsystem product, wherein (N) is greater than 1, and wherein (i) is greater than or equal to 1 and less than or equal to (N), and wherein (i) is initially set to 1. Step 435 further comprises interconnecting the test appliance and the configuration appliance to the (i)th data storage subsystem product. In certain embodiments, the test appliance is interconnected to one or more of the one or more host computer ports, such as for example host computer port 101 (FIGS. 1, 3), disposed in the (i)th data storage subsystem product. In certain embodiments, the configuration appliance is interconnected to one or more of the one or more device ports, such as for example device port 148 (FIGS. 1, 3), disposed in the (i)th data storage subsystem product.

Applicants' method transitions from step 435 to step 440 wherein the method supplies power to the (i)th data storage subsystem product, powers up that (i)th data storage subsystem product, and boots up the data storage subsystem product. Applicants' method transitions from step 440 to step 445 wherein the (i)th data storage subsystem product discovers attached devices, including the attached test appliance and the attached configuration appliance.

Applicants' method transitions from step 445 to step 450 (FIG. 4B), wherein the (i)th data storage subsystem product imports the storage configuration data, such as storage configuration data 350, from the interconnected configuration appliance. Further in step 450, the (i)th data storage subsystem product ignores the signature specific to the operable data storage subsystem of step 420, assumes ownership of the imported storage configuration data, and uses that storage configuration data as if that data had been created originally on the (i)th data storage subsystem product. Applicants' method transitions from step 450 to both steps 460 and to step 465. Steps 460 and 465 are initiated concurrently, and are performed, in whole or in part, synchronously.

Figure 4B:
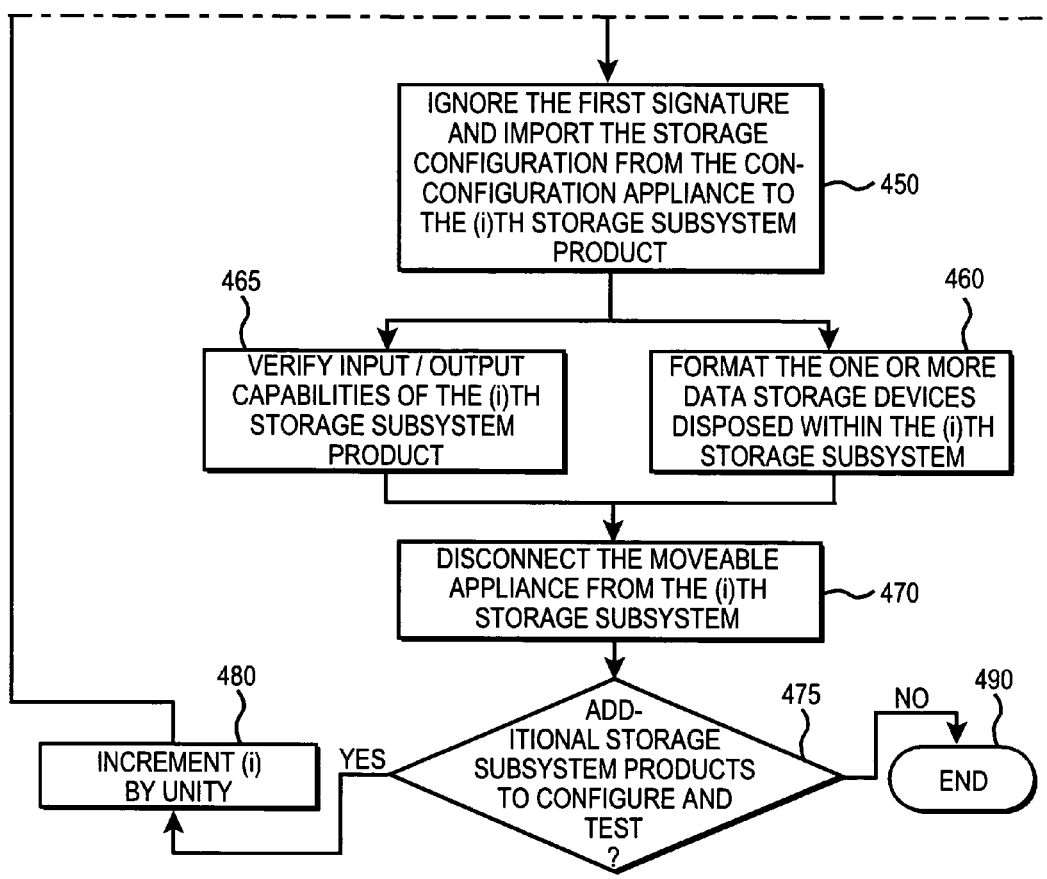
FIG. 4B is a flow chart summarizing additional steps of Applicants' method.

Referring now to FIG. 4B, in step 460 Applicants' method formats the one or more data storage devices disposed in the (i)th data storage subsystem product. Applicants' method transitions from step 460 to step 470.

In step 465, Applicants' method verifies the input/output capabilities of the configured (i)th storage subsystem product. In certain embodiments step 465 comprises testing, using the interconnected test appliance 340 (FIG. 3) and the interconnected configuration appliance 310 (FIG. 3), certain elements of the (i)th data storage subsystem product. In certain embodiments, step 465 comprises providing test data from test appliance 340 to one or more host computer ports disposed in data storage subsystem product 100, writing that test data to a data cache, such as data cache 150 (FIG. 1), reading that test data from the data cache, providing that test data to one or more device ports disposed in the data storage subsystem product, providing that test data from one or more device ports to the one or more data storage devices 320 disposed in configuration appliance 310, and optionally writing that test data using a RAID protocol to the one or more data storage devices disposed in configuration appliance 310. Step 465 further comprises reading test data from one or more storage devices 320, providing that test data to one or more device ports, providing that test data from the one or more device ports to one or more host computer ports, and providing that test data from one or more host computer ports to test appliance 340.

The tests of step 465 include, without limitation, determining input data transfer rates for each host port and for each device port, determining the output data transfer rates for each host port and for each device port, determining the input and output data transfer rates for the data cache, determining the storage capability for the data cache, detecting hard drive surface problems (e.g., bad clusters, bad sectors, partitioning/formatting problems, etc.), detecting drive recognition problems (e.g. hard drive that is not recognized by the operating system), and the like. Applicants' method transitions from step 465 to step 470.

In step 470, Applicants' method shuts down the (i)th data storage subsystem product, and disconnects the moveable configuration appliance and the test appliance from the (i)th data storage subsystem product. In the event the testing of step 465 generated one or more unacceptable test results, then in step 470 the (i)th data storage subsystem product is scheduled for repair/rework. Alternatively, if the test of step 465 did not generate one or more unacceptable test results, then step 470 further comprises packaging the (i)th data storage subsystem product for shipment.

Applicants' method transitions from step 470 to step 475 wherein the method determines if additional storage subsystem products are ready to be configured, formatted, and tested. If Applicants' method determines in step 475 that one or more additional data storage subsystem products are ready to be configured, initialized, formatted, and tested, then the method transitions from step 475 to 480 step wherein the method increments (i) by unity. Applicants' method transitions from step 480 to step 430 and continues as described herein. Alternatively, if Applicants' method determines in step 475 that no additional data storage subsystem products are ready to be configured, formatted, and tested, then the method transitions from step 475 to step 490 and ends.

In certain embodiments, individual steps recited in FIG. 4A and 4B may be combined, eliminated, or reordered.

In certain embodiments, Applicants' invention includes instructions written to memory, such as memory 142, where those instructions are executed by a processor, such as processor 140, to perform one or more of steps 440 and 445 recited in FIG. 4A, and/or to perform one or more of steps 450, 460, and 465, recited in FIG. 4B.

In other embodiments, Applicants' invention includes instructions residing in any other computer program product, where those instructions are executed by a computing device external to the data storage subsystem product, to perform one or more of steps 440 and 445 recited in FIG. 4A, and/or to perform one or more of steps 450, 460, and 465, recited in FIG. 4B.

In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to configure, format, and test, a data storage subsystem product, comprising the steps of:
    supplying a configuration appliance comprising appliance memory and a plurality of data storage devices;
    supplying an operable data storage subsystem comprising a storage configuration;
    interconnecting said configuration appliance with said operable data storage subsystem;
    creating on said configuration appliance storage configuration data comprising said storage configuration;
    supplying (N) data storage subsystem products, wherein each of said (N) data storage subsystem products comprises one or more host computer ports, a processor, one or more data storage device ports, and one or more data storage devices interconnected to said one or more data storage device ports wherein (N) is greater than 1;
    selecting an (i)th data storage subsystem product, wherein (i) is greater than or equal to 1 and less than equal to (N);
    connecting said configuration appliance to one of said one or more host computer ports disposed in the (i)th data storage subsystem product;
    powering said (i)th data storage subsystem product;
    importing said storage configuration data into said (i)th data storage subsystem product;
    formatting said one or more data storage devices;
    verifying the input/output data transfer rates of said (i)th data storage subsystem product, wherein said formatting step and said verifying step are initiated concurrently;
    wherein said one or more data storage devices are formatted only one time;
    disconnecting said configuration appliance from said (i)th data storage subsystem product;
    shutting down said (i)th data storage subsystem product;
    determining if (i) equals (N);
    operative if (i) is less than (N), incrementing (i) by unity and repeating said selecting, connecting, powering, importing, formatting, verifying, disconnecting, shutting down, and determining steps.

2. The method of claim 1, wherein said operable data storage subsystem further comprises a signature, and wherein said importing step further comprises ignoring by said data storage subsystem product said signature.

3. The method of claim 2, wherein said importing step further comprises using said storage configuration data by said data storage subsystem product.

4. The method of claim 3, further comprising the steps of:
    providing a test appliance comprising test data;
    interconnecting said test appliance to one or more of said host computer ports;
    verifying the input/output capabilities of the data storage subsystem product using said test appliance.

5. The method of claim 4, wherein said verifying step further comprises the steps of:
    providing said test data from said test appliance to said data storage subsystem product;
    writing said test data to said data cache;
    reading said test data from said data cache;
    providing said test data to said one or more device ports;
    providing said test data from said one or more device ports to the one or more data storage devices disposed in said configuration appliance;
    writing said test data to said one or more data storage devices disposed in said configuration appliance.

6. The method of claim 5, wherein said verifying step further comprises the steps of:
    reading said test data from said one or more data storage devices disposed in said configuration appliance;
    providing said test data from said configuration appliance to one or more device ports;
    providing said test data from said one or more device ports to said one or more host computer ports;
    providing said test data from said one or more host computer ports to said test appliance.

* * * * *